US008954094B1

(12) United States Patent  
Mishra et al.

(10) Patent No.: US 8,954,094 B1  
(45) Date of Patent: Feb. 10, 2015

(54) MOBILE DEVICE FUNCTIONS BASED ON TRANSPORTATION MODE TRANSITIONS

(71) Applicants: Arunesh Mishra, San Francsico, CA (US); Oded Fuhrmann, Cupertino, CA (US)

(72) Inventors: Arunesh Mishra, San Francsico, CA (US); Oded Fuhrmann, Cupertino, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/828,345

(22) Filed: Mar. 14, 2013

Related U.S. Application Data (60) Provisional application No. 61/657,328, filed on Jun. 8, 2012.

(51) Int. Cl.
*H04W 88/02* (2009.01)
*H04W 4/02* (2009.01)

(52) U.S. Cl.
CPC ..................................... *H04W 4/02* (2013.01)
USPC ...................................................... 455/456.3

(58) Field of Classification Search
USPC ............ 455/418, 456.3; 726/2; 701/410, 519; 710/303; 342/357.2
See application file for complete search history.

(56) References Cited

U.S. PATENT DOCUMENTS

| | | |
|---|---|---|
| 6,650,999 B1 | 11/2003 | Brust et al. |
| 2009/0098907 A1 | 4/2009 | Huntzicker et al. |
| 2011/0098087 A1 * | 4/2011 | Tseng ............................ 455/557 |
| 2011/0099392 A1 * | 4/2011 | Conway ......................... 713/300 |
| 2011/0165890 A1 * | 7/2011 | Ho et al. ..................... 455/456.1 |

OTHER PUBLICATIONS

Brush, A.J. Bernheim, et al., "User Experiences with Activity-Based Navigation on Mobile Devices," in *Proceedings of the 12th International Conference on Human Computer Interaction with Mobile Devices and Services (MobileHCI '10)*, 73-82, ACM, United States (2010).

Pielot, Martin, et al., "Dude, Where's My Car?: In-Situ Evaluation of a Tactile Car Finder," in *Proceedings of the 7th Nordic Conference on Human-Computer Interaction: Making Sense Through Design (NordiCHI '12)*, 166-169, ACM, United States (2012).

Perez, Sarah, "NFC in 2011: Launch Driver-Friendly Mobile Apps Using Your Car Keys," ReadWriteMobile, (2011), accessed at htt://readwrite.com/2011/06/23/nfc-2011-launch-driver-friendly-mobile-apps-using-your-car-keys on May 15, 2013.

* cited by examiner

*Primary Examiner* — Diane Mizrahi
(74) *Attorney, Agent, or Firm* — Marshall, Gerstein & Borun LLP (57) ABSTRACT

According to an embodiment, a method, system and computer program product of providing a user with a transportation mode transition location is provided. The method begins with monitoring movement of a mobile device associated with the user using a first transportation mode. Based on monitoring of the movement of the mobile device associated with the user, determining that the user has made a transition from the first transportation mode to a second transportation mode. An estimated location of the transition location is stored. Finally, the estimated location of the transition is provided to the user.

31 Claims, 7 Drawing Sheets

MOBILE DEVICE FUNCTIONS BASED ON TRANSPORTATION MODE TRANSITIONS

CROSS REFERENCE TO RELATED APPLICATIONS

This application claims the benefit of U.S. Provisional Patent Application No. 61/657,328, filed Jun. 8, 2012, entitled "Mobile Device Functions Based on Transportation Mode Transitions," which is incorporated herein in its entirety by reference.

FIELD

The field generally relates to mobile devices.

BACKGROUND

Modern users of mobile devices frequently carry their devices when they travel. Modern travel can involve many different modes of transportation, each with different important characteristics for a person to remember. A person taking a train may need to remember which train they took for a return trip. A person parking their car in a parking lot may need to remember where they left their car.

Other aspects of transportation modes may affect mobile phone functions. Mobile device functions that use wireless communications are prohibited from use while on an airplane, for example, and using a mobile phone for messaging while driving a car is unlawful in most jurisdictions.

BRIEF SUMMARY

Embodiments described herein relate to providing a user with a transportation mode transition location. According to an embodiment, the method begins with monitoring the movement of a mobile device associated with the user using a first transportation mode. Based on monitoring of the movement of the mobile device associated with the user, determining that the user has made a transition from the first transportation mode to a second transportation mode. An estimated location of the transition location is stored. Finally, the estimated location of the transition is provided to the user.

A system to provide a user with a transportation mode transition location includes a movement monitor configured to monitor the movement of a mobile device associated with the user using a first transportation mode. A transition determiner is configured to determine, based on monitoring by the movement monitor, that the user has made a transition from the first transportation mode to a second transportation mode. A location storer is configured to store an estimated location of the transition location. Finally, a location provider is configured to provide the estimated location of the transition to the user.

Further features and advantages, as well as the structure and operation of various embodiments are described in detail below with reference to the accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Overview

Figure 1:
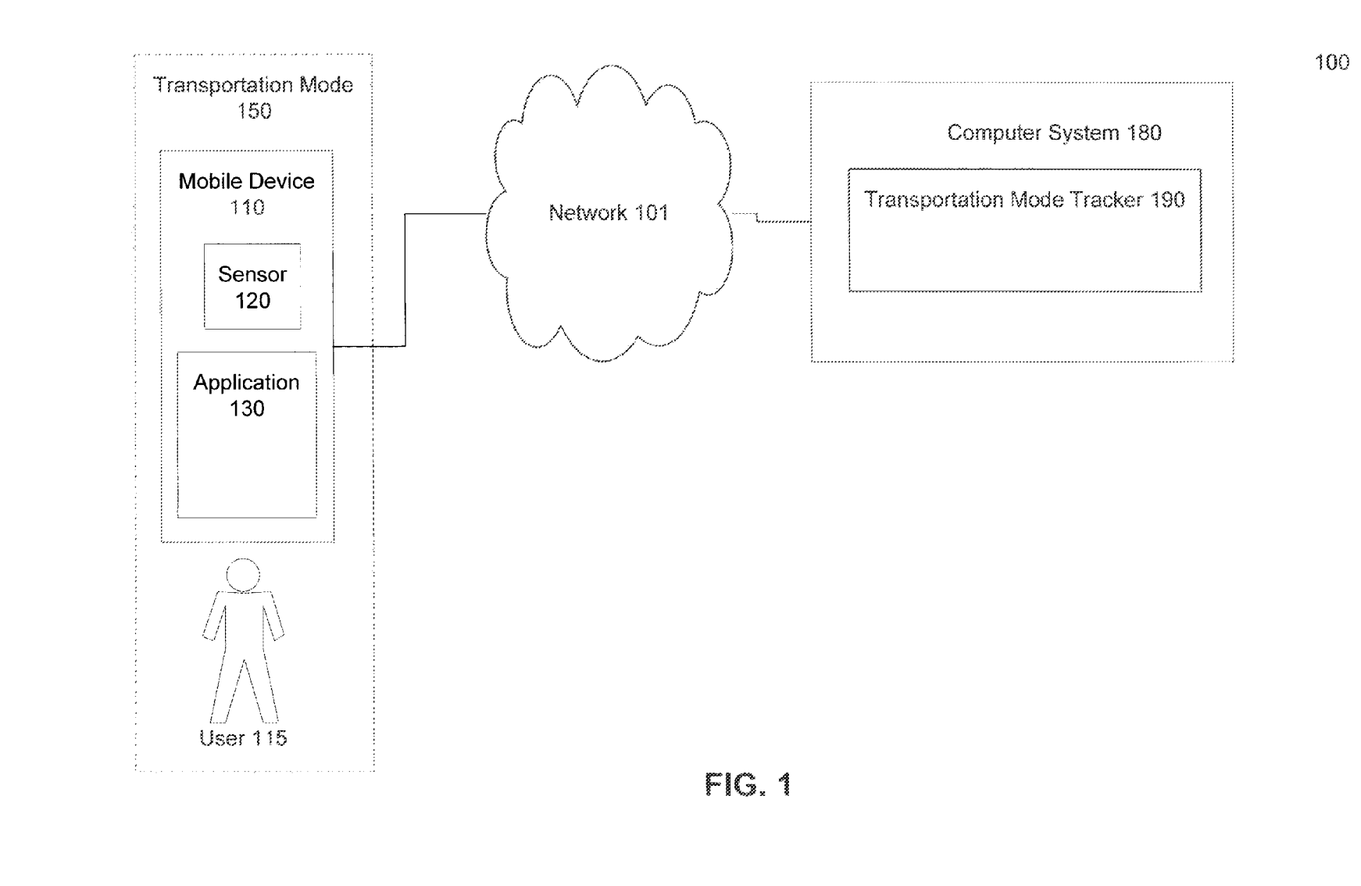
FIG. 1 is a block diagram of an architecture having mobile device and computer system having a transportation mode tracker, according to an embodiment.

FIG. 1 is a block diagram of an architecture 100 having mobile device 110 and computer system 180. Mobile device 110 has sensor 120 and application 130, and is coupled to computer system 180 via network 101. Computer system 180 has transportation mode tracker 190. Mobile device 110 is possessed by user 115 using transportation mode 150.

An exemplary embodiment of transportation mode tracker 190 described herein uses movement measurements gathered by sensor 120 in mobile device 110 to determine when a mobile device user 115 has transitioned from transportation mode 150 to another mode of transportation (not shown). Once it is determined that mobile device 110 has transitioned to from one mode to another mode of transportation, an estimated geographic location of the transition is stored.

Upon request by user 115, the transition point is displayed to user 115 using application 130.

An example using the exemplary embodiment applies to a transition between the transportation modes of moving in a car to walking. One event that typically occurs during this type of transition is that the car within which user 115 is driving is parked, potentially in a location that is forgotten by user 115. Having an embodiment automatically store this transition point between driving and walking (e.g., a parking place) for user 115 can assist user 115 in finding their parked car at a later time. As described below with reference to FIGS. 2-6, additional types of transportation mode transitions can be detected by embodiments, and additional useful related functions are described.

Sensors

Figure 2:
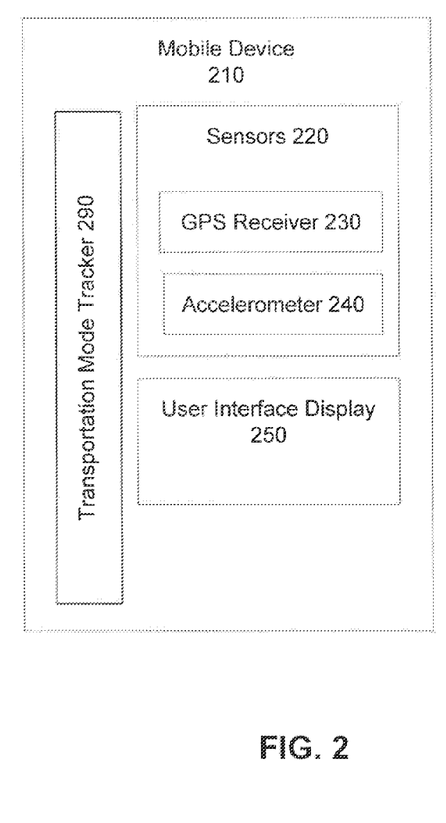
FIG. 2 is a block diagram of mobile device having sensors, user interface display and transportation mode tracker, according to an embodiment.

FIG. 2 is a block diagram of mobile device 210 having sensors 220, user interface display 250 and transportation mode tracker 290. Sensors 220 include Global Positioning System (GPS) receiver 230 and accelerometer 240. While transportation mode tracker 190 shown in FIG. 1 is located in computer system 180, FIG. 2 shows transportation mode tracker 290 in mobile device 210. In different embodiments different combinations of functions attributed herein to transportation mode trackers 190 and 290 can be performed in computer system 180 and/or mobile device 210. User interface display 250 is also a part of mobile device 210.

Global Positioning System Receiver (GPS) 230, in an embodiment, is a sensor component that receives signals from a space-based global navigation satellite system (GNSS) and provides location and time information. One having skill in the relevant art(s) would appreciate that any type of location determining system can be used by an embodiment to provide location and movement information for use by embodiments. For example, in some embodiments of mobile device 210, a WiFI based determination of location can be used.

Accelerometer 240 is a sensor component that measures the relative motion of the mobile device 210. It would be appreciated by one having skill in the relevant art(s), given the description herein, that additional types of sensors 220 can be used by embodiments to provide movement measurements without departing from the spirit of embodiments described herein.

Movement Measurements

Different measurements of movement can be tracked by different sensors 220 used by embodiments. Certain combinations of movement measurement values are indicative of different modes of transportation. One approach, used by an embodiment, uses changes in movement measurements to determine that mobile device 210 has transitioned from one mode of transportation to another mode of transportation. In this first general approach, the specific modes of transportation are not identified, rather, only the transition from one transportation mode to another transportation mode is identified and noted.

In a second approach, collected movement measurements are compared to transportation mode profiles to estimate the particular mode of transportation being used. For example, walking, moving in a vehicle, moving in an airplane, moving on a boat, moving on a train, can all be identified by embodiments based on collected movement measurements. When the use of a new transportation mode is identified, a transportation mode transition is noted.

Example movement measurements M1-M7 below are a non-limiting list of measurements used by different embodiments, their mode of collection and their potential usefulness to embodiments:

M1. Velocity: GPS receiver 230 can collect the velocity of mobile device 210. Certain changes in velocity can signal a transportation mode change. For example, transitioning from moving in a car to walking, entails a significant change in velocity, as does transitioning from traveling in a train to walking.

One having skill in the relevant art(s), given the description herein, will appreciate that certain measured velocities are also strongly indicative of particular modes of transportation. For example, a walker, a road vehicle and an airplane, each travel at a characteristic velocity. Different velocities can be used by an embodiment to estimate the mode of transportation being currently used. A transportation mode profile can include velocity characteristics of a particular mode of transportation, and an embodiment can compare a measured velocity to the profile. This comparison can enable an embodiment to determine mode of transportation.

One having skill in the relevant art(s), given the description herein, will appreciate other uses of velocity measurements by embodiments.

M2. Acceleration/Deceleration: Accelerometer 240 can collect acceleration/deceleration measurements and, as would be appreciated by one having skill in the relevant art(s), given the description herein, acceleration/deceleration can also be estimated based on GPS receiver 230 velocity measurements. Changes in acceleration/deceleration forces can also be indicative of transportation mode changes. For example, changing from moving in a car to walking, entails a significant change in acceleration/deceleration.

Certain acceleration/deceleration forces are also strongly indicative of particular modes of transportation. One having skill in the relevant art(s), given the description herein, will appreciate that traveling in airplane, boat, train and car each have particular acceleration/deceleration characteristics which can be used by an embodiment. One having skill in the relevant art(s), given the description herein, will appreciate other uses of accelerometer measurements by embodiments.

M3. Altitude/Changes in Altitude: GPS devices can collect altitude measurements. Certain altitudes/changes in altitude can be strongly indicative of a transportation mode change. For example, transitioning from walking on an airplane during an airplane flight to walking in an airport, entails a significant change in altitude. The airplane landing also entails a characteristic gradual change in altitude.

Certain altitudes/changes in altitude are strongly indicative of the particular mode of transportation being used. For example, airplanes have distinctive altitude characteristics as compared to other modes of transportation. In addition, for example, when comparing a railroad means of transportation to road-based mode of transportation, trains generally have a maximum rate of gaining altitude that is below that of a road-based vehicle. One having skill in the relevant art(s), given the description herein, will appreciate other uses of altitude measurements by embodiments.

In another embodiment, when collected movement measurements indicate that mobile device 110 is being used in an airplane functions mobile device 110 can be modified. For example, when altitude and velocity indicate that mobile device 110 is in an airplane that is flying, wireless features of mobile device 110 can be disabled.

M4. Changes in Direction: Changes in direction can be measured by GPS receiver 230 and certain types of accelerometer 240 devices. Certain changes in direction can be indicative of a transportation mode changes. For example, similar to the altitude measurement discussed above, when comparing means of transportation, trains and planes generally have a maximum rate of changing direction that is below that of a road-based vehicle.

It should be appreciated that, some movement measurements may need to be combined with other movement measurements to identify transportation mode changes and/or transportation modes. For example, while automobiles and trains have similar velocity characteristics, these modes of transportation have different direction change characteristics. Automobiles can make 90+ degree turns, while trains cannot turn this sharply.

M5. Irregular Movements: This broad type of measurement can correspond to a variety of different types of irregularities in measured features. Examples of irregular movements associated with different modes of transportation include: Potholes hit by a car, turbulence experienced in an airplane, a misstep of a person walking.

As noted in motion measurement M4 above, certain movement measurements can be combined with other movement measurements to estimate transportation mode used. For example, certain velocity and acceleration movements may be indicative of moving on a road in a vehicle, but may not be indicative of the type of vehicle. Measured irregular movements may provide an additional factor that identifies the type of vehicle. For example, certain larger trucks, having diesel engines, may have certain vibration characteristics as compared to an automobile that can be measured and assessed by an embodiment M6. Regular Movements: This broad type of measurement can correspond to a variety of different types of irregularities in measured features. Examples of regular movements include: walking, the vibrations caused by a train on a railroad track, the vibrations from a vehicle driving over the seams on a roadway.

As would be appreciated by one having skill in the relevant art(s), given the description herein, certain measured regular and irregular movements can also be indicative of particular geographic locations. For example, a particular highway may have pavement seams at a particular interval. When mobile device 210 is carried by a user traveling in an automobile on the example highway, the vibrations caused by the pavement seams may be detected as regular movement measurements. Based on these measurements, an embodiment of transportation mode tracker 290 identifies the mode of transportation as traveling by a motor vehicle on the example highway. As would be appreciated by one having skill in the relevant art(s), given the description herein, other types of regular movements could also be used to provide similar features.

M7. Geographic Location: GPS devices measure geographic location by their standard operation. Certain geographic locations are indicative of particular modes of transportation. Example geographic locations that are strongly indicative of particular modes of transportation include: a freeway (automobile, truck, bus), a river (boat), a railroad track (train).

M8. Stopping: The act of using one mode of transportation then stopping can be considered a transportation mode change for an embodiment. For example, a user having mobile device 110 is walking in a park then stops to sit on a bench. Later, after sitting for a period of time, the user returns to walking through the park. Using approaches described above, this walking mode of transportation is determined by an embodiment, as is the transition to stopping and eventual transition back to the mode of walking. Later, when the user realizes they have lost their wallet, an embodiment can be queried as to all locations where they stopped while walking.

An embodiment can apply a threshold to the stopping action so as to limit insignificant stops from being noted. For example, only stops for longer than five (5) minutes can be counted as a transportation mode change. One having skill in the relevant art(s), given the description herein, will appreciate that using stopping a mode of transportation as a mode of transportation can be useful for other implementations as well.

Given the description herein, one having skill in the relevant art(s) will appreciate additional sensors, measurements and approaches that can provide useful movement information to embodiments.

It is important to note that, for all movement measurements discussed herein, a pattern of measurements over time can be used by embodiments to detect transportation mode transitions/identify transportation modes. An embodiment can analyze movement measurements over time to distinguish between temporary movement changes in a single transportation mode and transportation mode transitions. For example, an automobile will start and stop as it travels, having repeated velocity and/or acceleration measurements. An embodiment can distinguish between a temporary stop and a transition where the mobile device is being transported by walking.

As would be appreciated by one having skill in the relevant art(s), given the description herein, different modes of transportation may generate different measurements from sensor 120. Individual sensor readings may be different as well as patterns of measurements collected over time.

Transportation Mode Tracker

Figure 3:
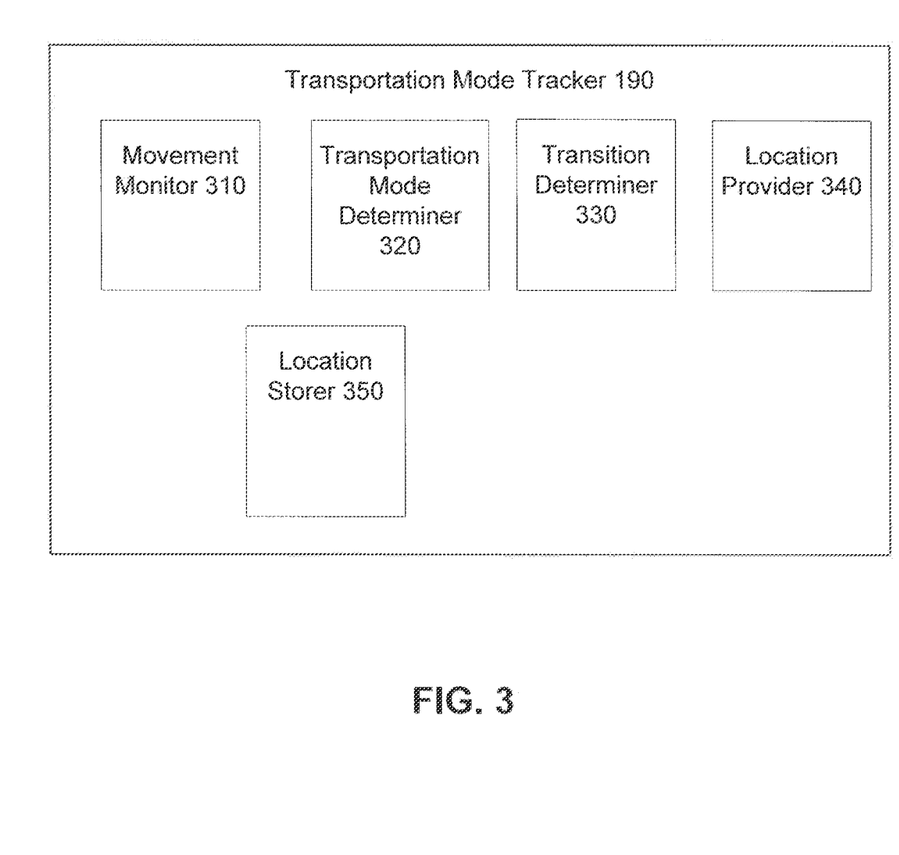
FIG. 3 is a block diagram of transportation mode tracker having a movement monitor, a transportation mode determiner, a transition determiner, a location storer and a location provider, according to an embodiment.

FIG. 3 is a more detailed block diagram of transportation mode tracker 190 having movement monitor 310, transportation mode determiner 320, transition determiner 330, location storer 350 and location provider 340.

In an embodiment, movement monitor 310 is configured to monitor the movement of mobile device 110 associated with user 115 using transportation mode 150. Sensors 220 provide movement information to movement monitor 310 either continuously or at an interval. As discussed with respect to FIG. 2 above, sensors 220 can be one or more sensors, for example accelerometer 240 and/or GPS receiver 230.

One approach, used by movement monitor 310, monitors multiple measurements from sensors 220 collected over time. Transition determiner 330 receives movement measurements from movement monitor 310. By analyzing these measurements over time, transition determiner 330 can determine when user 115 (having mobile device 110) has transitioned from one mode of transportation to another mode of transportation. It should be noted that, as used herein, "determining" a mode of transportation and/or transition is equivalent to "estimating" the foregoing information.

For example, transition determiner 330 is configured to determine, based on monitoring by movement monitor 310, that user 115 has made a transition from transportation mode 150 to a second transportation mode. Once a transportation mode transition has been determined, location storer 350 is configured to store an estimated location where the transition occurred. In an embodiment, because transition estimates may be imprecise, multiple estimated locations can be stored for retrieval.

Based on requests from different applications, location provider 340 is configured to provide one or more of the stored estimated locations of estimated transitions by mobile device 110.

In some circumstances, the type of request made by user 115 can denote the type of transportation mode transition for which a location has been stored. For example, when user 115 selects a user interface option in application 130 for "find my parking space" an embodiment can estimate that the stored location associated with the last transportation mode transition is a parking space location.

Figure 4:
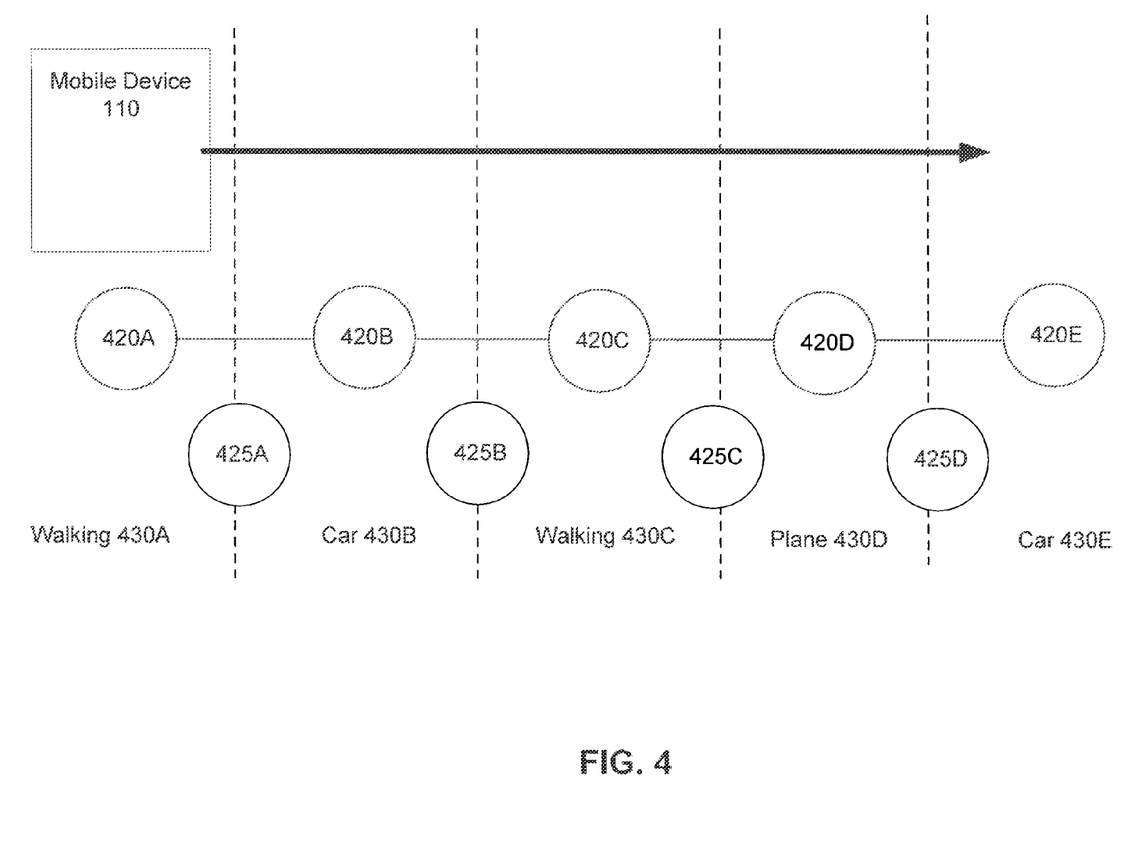
FIGS. 4 and 5 are diagrams showing mobile devices in different locations using different modes of transportation, according to embodiments.

FIG. 4 is a diagram showing mobile device 110 in different locations 420A-E using different modes of transportation: walking 430A, car 430B, walking 430C, airplane 430D and walking 430E. Transitions 425A-D mark the transition from one mode of transportation 430A-E to another mode of transportation: transition 425A from walking 430A to car 430B, transition 425B from car 4308 to walking 430C, transition 425C from walking 430C to airplane 430D, and transition 425D from airplane 430D to car 430E.

In one embodiment, based on movement measurements received by movement monitor 310 from sensors 220, transition determiner 330 estimates when mobile device 110 has transitioned from traveling using a first transportation mode to a second transportation mode. As shown on FIG. 4, mobile device 110, traveling using transportation mode walking 430A, transitions 425A to transportation mode car 430B. It is important to note that, in this embodiment, neither transportation mode 430A nor 430B are determined by transportation mode tracker 190. Only the transition 425A, determined by transition determiner 330, is used to trigger additional actions by embodiments. Example actions are discussed with respect to FIG. 5 below.

In another embodiment, based on movement measurements received by movement monitor 310 from sensors 220, transportation mode determiner 320 estimates each transportation mode used, not just the transition. With reference to FIG. 4, for example, based on the movement measurements from mobile device 110, the transportation mode walking 430A is estimated. After transition 425A, the transportation mode car 430B is estimated.

Figure 5:
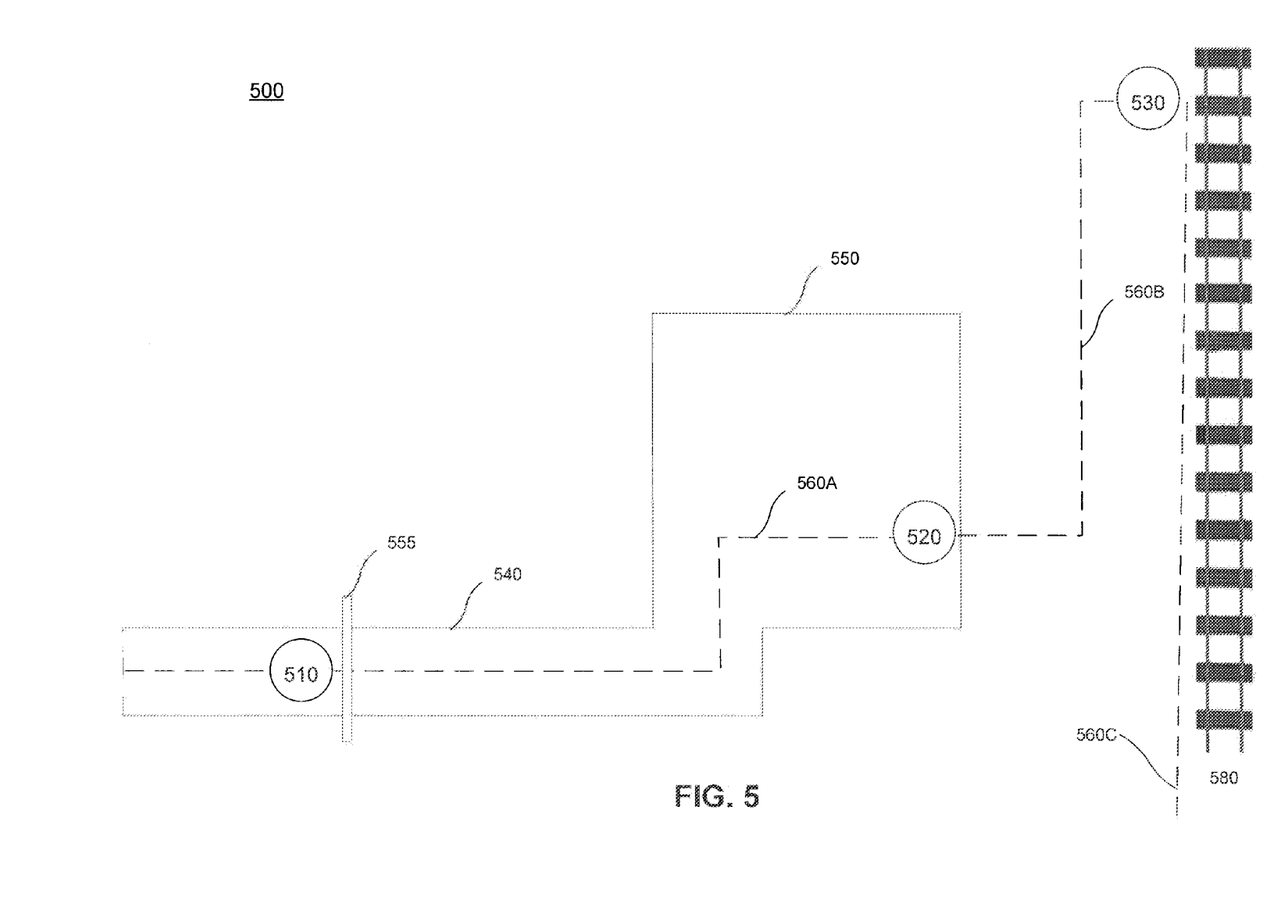

FIG. 5 is a map 500 of a road 540, a parking lot 550 and a railroad track 580. Paths 560A-C shows the route of a mobile device 110 possessed by user 115 as they travel using three different modes of transportation. A first mode of transportation is used for path 560A, a second mode is used for path 560B and a third mode is used for path 560C. Points 510, 520 and 530 on paths 560A-B are locations where movement stops. Point 555 is a stop light on road 540.

In an example shown using FIG. 5, transportation mode tracker 190 uses movement monitor 310, transition determiner 330 and location storer 350 to provide a user with useful information about their travel. For example, upon request, transportation mode tracker 190 can inform a user that they parked at point 520, and that they used a train station at point 530 to board a train.

In this example, user 115 having mobile device 210 travels along path 560A in an automobile. During the travel, movement monitor 310 determines, using movement measurements from GPS receiver 230 and accelerometer 240, that user 115 is traveling using a first mode of transportation. In a variation of this example, transportation mode determiner 320 is used to compare the movement measurements to transportation mode profiles. Based on the movement measurements, transportation mode determiner 320 determines that an automobile is the first mode of transportation.

While driving, user 115 stops at point 510 for stoplight 555. After a short duration at the stoplight 555, user 115 continues driving along path 560A. Based on movement measurements received, transportation mode determiner 320 determines that a potential change in transportation mode is occurring. In one approach, based on a potential change in transportation mode, a geographic position reading corresponding to point 510 from GPS receiver 230 is stored by location storer 350. Having this stored location allows point 510 to be provided, if needed, at a later time.

Because user 115 continues, after a short stop, along path 560A using the same automobile mode of transportation, transportation mode determiner 320 can estimate that the same mode of transportation is being used. In one approach, because a transportation mode transition is not detected, point 510, stored by location storer 350 is erased as not needed. When a longer stop is detected, combined with other movement, transportation mode determiner 320 may estimate that a different mode of transportation is being used, e.g., a different vehicle.

Continuing to drive, user 115 enters parking lot 550 and parks in a parking space at point 520. At point 520, the mode of transportation used by user 115 transitions from traveling in an automobile to walking. As noted above, upon determining that user 115 has transitioned from one mode of transportation to another, transportation mode determiner 320 stores a geographic location corresponding to point 520 using location storer 350. At a later time, a query by user 115 to transportation mode tracker 190 will cause location provider 340 to provide point 520 to user 115.

In one approach, because transportation mode determiner 320 determines that path 560A was traveled using an automobile and path 560B was traveled by walking, location provider 340 labels point 520 as a parking space. In another approach, where the transportation modes are not determined, location provider 340 provides several potential parking spots to user 115.

Exiting the automobile, user 115 follows path 560B and waits for a train at point 530. User 115 enters a train and follows path 560C along railroad track 580. Entering the train at point 530, user 115 transitions from walking to traveling by train. Because point 530 is a transportation mode transition point, location storer 350 stores a geographic location corresponding to point 530 for future use.

Upon a query to transportation mode tracker 190, location provider 340 provides point 530 to user 115. In one approach, transportation mode determiner 320 determines that the use traveled along path 560C by train, and thus that user 115 boarded a train at point 530. Upon a request to location provider 340, point 530 can be labeled as a train station where user 115 boarded a train.

It is important to note that, the storing of transportation mode transition points can be used for a variety of reasons. As noted above, the actual modes of transportation do not need to be identified in order to provide useful information to user 115.

In another embodiment described with reference to FIG. 5, user 110 having mobile device 110 is a passenger on a bus driving on road 540. Path 560A shows the path of the bus driving on road 540. As the bus travels it makes regular stops to let off and take on passengers (not shown). As the bus travels, movement monitor 310 is used to collect movement measurements and transportation mode determiner 320 compares them to transportation mode profiles. Because of the characteristics of the bus movement, transportation mode determiner 320 can determine that user 115 is on a bus. For example, the frequency of the stops, the duration of the stops, the following of a known bus path (by GPS receiver 230 measurements), are example characteristics that can be used by transportation mode determiner 320. One having skill in the relevant art(s), given the description herein, would appreciate that additional characteristics can also be used.

Once transportation mode determiner 320 has determined that user 115 is on a bus following a bus route, the bus route can be identified. The known bus route, as determined by GPS receiver 230 measurements, can identify the route to the user and display upcoming stops. The bus route history can also be stored for user 115 in location storer 350 for later retrieval.

Method

Figure 6:
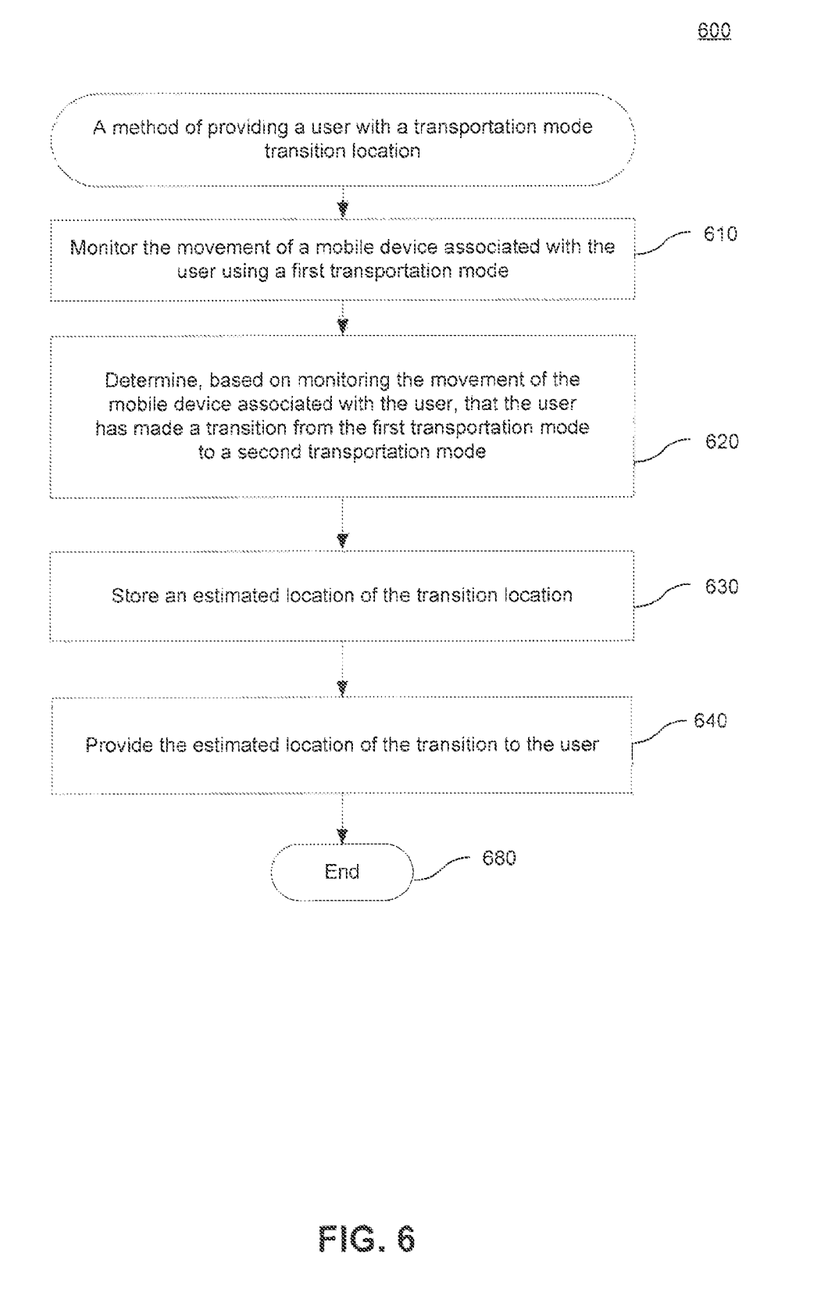
FIG. 6 is a flowchart illustrating a method of providing a user with a transportation mode transition location, according to an embodiment.

FIG. 6 illustrates an exemplary method 600 of providing a user with a transportation mode transition location. As shown in FIG. 6, method 600 begins at stage 610 where movement of a mobile device associated with the user using a first transportation mode is monitored. For example, as shown on FIGS. 1, 2 and 5, the movement mobile device 210 associated with user 115 is monitored by sensors 220. Mobile device 110 is moving by automobile along path 560A. Once stage 610 is complete, method 600 proceeds to stage 620.

In stage 620, based on monitoring the movement of the mobile device associated with the user, a determination is made that the user has made a transition from the first transportation mode to a second transportation mode. For example, based on monitoring the movement of mobile device 210, a determination is made at point 520, that user 115 has made a transition from traveling by automobile to walking. Once stage 620 is complete, method 600 proceeds to stage 630.

In stage 630, an estimated location of the transition location is stored. For example, an estimated location of point 520 is stored. Once stage 630 is complete, method 600 proceeds to stage 640.

In stage 640, the estimated location of the transition is provided to the user. For example, the stored estimated location of point 520 provided to user 115. Once stage 640 is complete, method 600 ends.

Example Computer System Implementation

Figure 7:
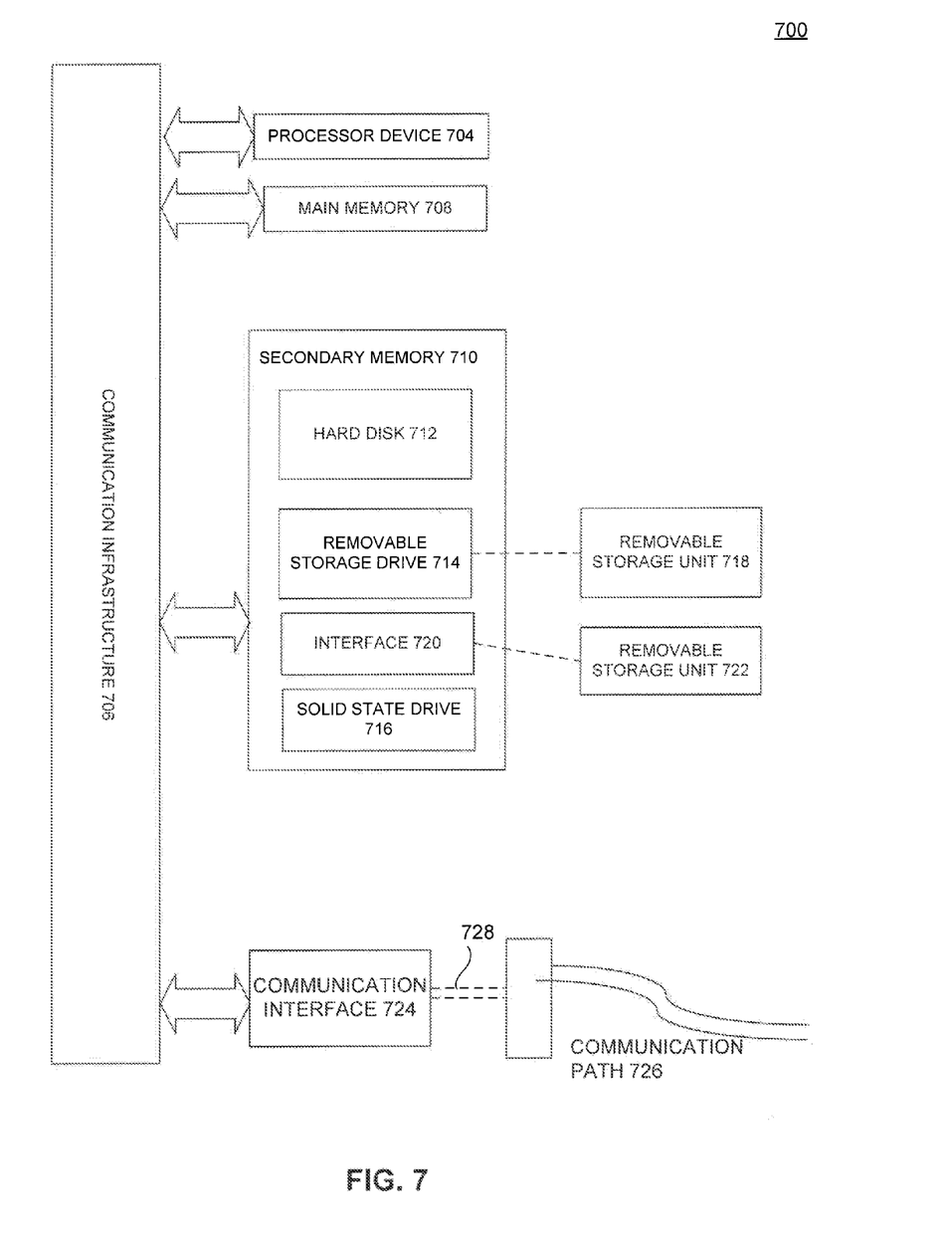
FIG. 7 is an example computer system that can be used to implement an embodiment.

FIG. 7 illustrates an example computer system 700 in which embodiments of the present invention, or portions thereof may be implemented. For example, FIGS. 1-5 and stages of method 600 of FIG. 6 may be implemented in computer system 700 using hardware, software, firmware, tangible computer readable media having instructions stored thereon, or a combination thereof and may be implemented in one or more computer systems or other processing systems. Hardware, software or any combination of such may embody any of the modules/components in FIGS. 1-5 and any stage in FIG. 6. Mobile devices 110 and 210, network 101 and computer system 180 can also be implemented using components of computer system 700.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

For instance, at least one processor device and a memory may be used to implement the above described embodiments. Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network or multi-core message-passing scheme.

Computer system 700 also includes a main memory 708, for example, random access memory (RAM), and may also include a secondary memory 710. Secondary memory 710 may include, for example, a hard disk drive 712, removable storage drive 714 and solid state drive 716. Removable storage drive 714 may include a floppy disk drive, a magnetic tape drive, an optical disk drive, a flash memory, or the like. The removable storage drive 714 reads from and/or writes to a removable storage unit 718 in a well known manner. Removable storage unit 718 may include a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such storage means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in electronic, electromagnetic, optical, or other forms capable of being received by communications interface 724. This data may be provided to communications interface 724 via a communications path 726. Communications path 726 carries the data and may be implemented using wire or cable, fiber optics, a phone line, a cellular phone link, an RF link or other communications channels.

In this document, the terms "computer program storage medium" and "computer usable storage medium" are used to generally refer to media such as removable storage unit 718, removable storage unit 722, and a hard disk installed in hard disk drive 712. Computer program storage medium and computer usable storage medium may also refer to memories, such as main memory 708 and secondary memory 710, which may be memory semiconductors (e.g., DRAMs, etc.).

Computer programs (also called computer control logic) may be stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the stages in method 600 illustrated by FIG. 6 discussed above. Accordingly, such computer programs represent controllers of the computer system 700. Where the invention is implemented using software, the software may be stored in a computer program product and loaded into computer system 700 using removable storage drive 714, interface 720, hard disk drive 712 or communications interface 724.

Embodiments of the invention also may be directed to computer program products comprising software stored on any computer readable medium. Such software, when executed in one or more data processing devices, causes a data processing device(s) to operate as described herein. Embodiments of the invention employ any computer useable or readable storage medium. Examples of computer useable storage media include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to controlling mobile device functions based on transportation mode transitions. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of providing a user with a transportation mode transition location, comprising: monitoring movement of a mobile device associated with the user using a first transportation mode; determining, based on monitoring the movement of the mobile device associated with the user, that the user has made a transition from the first transportation mode to a second transportation mode; storing an estimated location of the transition location; and providing the estimated location of the transition to the user.

2. The method of claim 1, further comprising, before determining that the user has made a transition from the first transportation mode to a second transportation mode, determining the first transportation mode based on monitoring the movement of the mobile device.

3. The method of claim 2, wherein storing an estimated location of the transition location comprises storing an estimated car parking space location.

4. The method of claim 1, wherein monitoring the movement of a mobile device comprises monitoring an accelerometer in the mobile device.

5. The method of claim 3 wherein determining, based on the monitoring of the mobile device associated with the user, that the user has made a transition from the first transportation mode to a second transportation mode comprises:
   comparing accelerometer measurements to a plurality of transportation profiles, wherein each transportation profile is based on accelerometer measurements of a mode of transportation.

6. The method of claim 1, wherein monitoring the movement of a mobile device comprises monitoring a Global Positioning System receiver in the mobile device.

7. The method of claim 5 wherein determining, based on the monitoring of the mobile device associated with the user, that the user has made a transition from the first transportation mode to a second transportation mode comprises:
   comparing Global Positioning System measurements to a plurality of transportation profiles, wherein each transportation profile is based on speed measurements of a mode of transportation.

8. The method of claim 5 wherein determining, based on the monitoring of the mobile device associated with the user, that the user has made a transition from the first transportation mode to a second transportation mode comprises:
   comparing Global Positioning System measurements to a plurality of transportation profiles, wherein each transportation profile is based on locations associated with a mode of transportation.

9. The method of claim 1, wherein determining, based on monitoring the mobile device associated with the user, that the user has made a transition from the first transportation mode to a second transportation mode comprises determining that the user has transitioned from riding in an automobile to walking.

10. The method of claim 8, wherein determining, based on monitoring the mobile device associated with the user, that the user has made a transition from riding in an automobile to walking is based on monitored changes in the acceleration of the mobile device.

11. The method of claim 8, wherein determining, based on monitoring the mobile device associated with the user, that the user has made a transition from riding in an automobile to walking is based on monitored changes in a measured velocity of the mobile device.

12. The method of claim 8, wherein providing the estimated location of the transition to the user comprises providing an estimated location of where the automobile is parked.

13. The method of claim 1, wherein determining, based on monitoring the mobile device associated with the user, that the user has made a transition from the first transportation mode to a second transportation mode comprises determining that the user has transitioned from riding in a train to walking.

14. The method of claim 1, wherein determining, based on monitoring the mobile device associated with the user, that the user has made a transition from the first transportation mode to a second transportation mode comprises determining that the user has transitioned from walking to flying in an airplane.

15. The method of claim 13, wherein determining, based on monitoring the mobile device associated with the user, that the user has made a transition from walking to flying in an airplane is based on monitored changes in the altitude of the mobile device.

16. A system for providing a user with a transportation mode transition location, comprising: a movement monitor configured to monitor the movement of a mobile device associated with the user using a first transportation mode; a transition determiner configured to determine, based on monitoring by the movement monitor, that the user has made a transition from the first transportation mode to a second transportation mode; a location storer configured to store an estimated location of the transition location; and a location provider configured to provide the estimated location of the transition to the user.

17. The system of claim 15, further comprising a transition mode determiner configured to determine, based on the monitoring by the movement monitor, the first and second modes of transportation.

18. The system of claim 15, wherein the movement monitor is configured to monitor the movement of a mobile device by monitoring an accelerometer in the mobile device.

19. The system of claim 17 wherein the transition determiner is configured to determine that the user has made a transition from the first transportation mode to a second transportation mode by comparing accelerometer measurements to a plurality of transportation profiles, wherein each transportation profile is based on accelerometer measurements of a mode of transportation.

20. The system of claim 15, wherein the movement monitor is configured to monitor the movement of a mobile device by monitoring a Global Positioning System receiver in the mobile device.

21. The system of claim 19 wherein the transition determiner is configured to determine that the user has made a Global Positioning System from the first transportation mode to a second transportation mode by comparing GPS measurements to a plurality of transportation profiles, wherein each transportation profile is based on speed measurements of a mode of transportation.

22. The system of claim 19 wherein the transition determiner is configured to determine that the user has made a transition from the first transportation mode to a second transportation mode by comparing Global Positioning System measurements to a plurality of transportation profiles, wherein each transportation profile is based on locations associated with a mode of transportation.

23. The system of claim 15 wherein the transition determiner is configured to determine that the user has transitioned from riding in an automobile to walking.

24. The system of claim 22 wherein the transition determiner is configured to determine that the user has transitioned from riding in an automobile to walking based on monitored changes in the acceleration of the mobile device.

25. The system of claim 21 wherein the transition determiner is configured to determine that the user has transitioned from riding in an automobile to walking based on monitored changes in the velocity of the mobile device.

26. The system of claim 22 wherein the location provider is configured to provide an estimated location of where the automobile is parked.

27. The system of claim 15 wherein the transition determiner is configured to determine that the user has transitioned from riding in a train to walking.

28. The system of claim 15 wherein the transition determiner is configured to determine that the user has transitioned from walking to flying in an airplane.

29. The system of claim 27 wherein the transition determiner is configured to determine that the user has transitioned from walking to flying in an airplane is based on monitored changes in the altitude of the mobile device.

30. A computer-readable medium having computer-executable instructions stored thereon that, when executed by a computing device, cause the computing device to perform a method providing a user with a transportation mode transition location, comprising: monitoring movement of a mobile device associated with the user using a first transportation mode; determining, based on monitoring the movement of the mobile device associated with the user, that the user has made a transition from the first transportation mode to a second transportation mode; storing an estimated location of the transition location; and providing the estimated location of the transition to the user.

31. A system for identifying route information about a mode of transportation, comprising: a movement monitor configured to monitor the movement of a mobile device associated with the user using a transportation mode; a transportation mode determiner configured to: determine, based on monitoring by the movement monitor, a transportation mode used by the user, wherein the determined transportation mode has an established route; determine, based on location information from the movement monitor, the established route of the transportation mode; a location storer configured to store information corresponding to the determined established route of the transportation mode; and a location provider configured to provide the stored route information.

* * * * *